(12) United States Patent
LoCascio

(10) Patent No.: US 8,704,494 B2
(45) Date of Patent: Apr. 22, 2014

(54) CIRCUIT TOPOLOGY FOR PULSED POWER ENERGY HARVESTING

(75) Inventor: James Jason LoCascio, Mountain View, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 593 days.

(21) Appl. No.: 13/072,411

(22) Filed: Mar. 25, 2011

(65) Prior Publication Data

US 2011/0241625 A1  Oct. 6, 2011

Related U.S. Application Data

(60) Provisional application No. 61/319,169, filed on Mar. 30, 2010.

(51) Int. Cl.
*H02J 7/04* (2006.01)
*H02J 7/16* (2006.01)

(52) U.S. Cl.
USPC ............ 320/140; 320/166; 320/167; 320/101

(58) Field of Classification Search
USPC .......... 320/101, 140, 166, 167; 307/109, 110; 363/49
See application file for complete search history.

(56) References Cited

U.S. PATENT DOCUMENTS

| | | | |
|---|---|---|---|
| 5,077,652 A | 12/1991 | Faley | |
| 5,818,125 A * | 10/1998 | Manchester | 307/66 |
| 6,310,789 B1 * | 10/2001 | Nebrigic et al. | 363/60 |
| 7,081,693 B2 * | 7/2006 | Hamel et al. | 307/151 |
| 7,429,805 B2 | 9/2008 | Hamel et al. | |
| 7,429,936 B2 | 9/2008 | Paradiso et al. | |
| 7,560,910 B2 * | 7/2009 | Hata et al. | 323/222 |
| 2003/0169022 A1 * | 9/2003 | Turner et al. | 320/166 |
| 2005/0253563 A1 * | 11/2005 | Logsdon | 320/166 |
| 2006/0133003 A1 * | 6/2006 | Kular et al. | 361/100 |
| 2008/0047363 A1 | 2/2008 | Arms et al. | |
| 2008/0143301 A1 * | 6/2008 | Bartilson | 320/167 |

OTHER PUBLICATIONS

MAX856-MAX859 3.3V/5V or Adjustable-Output, Step-Up DC-DC Converters Data Sheet, Maxim Integrated Products, Inc., May 1996, pp. 1-12.
International Search Report and Written Opinion dated May 31, 2011, PCT Application No. PCT/US2011/030347, Filed Mar. 29, 2011, Maxim Integrated Products, Inc.
Arms et al. "Power Management for Energy Harvesting Wireless Sensors", SPIE Int'l on smart Structures & Smart Materials, Mar. 9, 2005, pp. 1-9.
"Harnessing Solar Power with Smart Power-Conversion Techniques", Maxim Application Note 484, pp. 1-8, Dec. 1, 2000.

* cited by examiner

*Primary Examiner* — Yalkew Fantu
(74) *Attorney, Agent, or Firm* — North Weber & Baugh LLP

(57) ABSTRACT

An energy harvesting circuit harvests energy from a voltage source and charges a storage element with the harvested energy. The energy harvesting circuit includes an energy source, a storage capacitor to store energy output from the energy source, a power converter circuit, an energy storage element, and an enabling circuit. The enabling circuit turns the boost converter circuit on and off according to a monitored capacitance voltage of the storage capacitor. When the boost converter circuit is turned off, the storage capacitor accumulates energy output from the energy source until a reference voltage is reached, whereupon the boost converter circuit is turned on, enabling current flow from the storage capacitor to the storage element. When the storage capacitor discharges to a minimum voltage level, the boost converter circuit is turned off. The enabling circuit and a reference voltage supply are powered by the energy source.

37 Claims, 5 Drawing Sheets

CIRCUIT TOPOLOGY FOR PULSED POWER ENERGY HARVESTING

RELATED APPLICATIONS

This application claims priority of U.S. provisional application, Ser. No. 61/319,169, filed Mar. 30, 2010, and entitled "NEW CIRCUIT TOPOLOGY FOR PULSED POWER ENERGY HARVESTING", by the same inventor. This application incorporates U.S. provisional application, Ser. No. 61/319,169 in its entirety by reference.

FIELD OF THE INVENTION

The present invention relates to the field of energy harvesting. More particularly, the present invention relates to the field of low power energy harvesting to charge energy storage devices.

BACKGROUND OF THE INVENTION

An energy harvesting circuit can be used to harvest energy from an energy source and charge a battery using the harvested energy. There are conventional energy harvesting circuits configured to harvest energy at very low power levels if the energy source voltage is the same or higher than the battery voltage. There are also known energy harvesting configurations for harvesting energy at levels down to about 50 uW when the harvesting source voltage is 8 to 20 times lower than the output (battery) voltage. Current needs for energy harvesting are at or below a few microwatts, for example about 2 uW, and trending downward. Smaller sized energy sources generate low power levels at low voltage levels. An example of such an energy source is a small solar cell that generates about 2 uW and about 0.5V. A problem lies in how to harvest energy at a voltage level that is much less than the battery voltage, and to boost the harvested voltage to the battery voltage in an efficient means at those power levels.

FIG. 1A illustrates a conceptual schematic diagram of a conventional energy harvesting circuit configured to harvest energy from a low power source at low voltage to charge a battery. The energy harvesting circuit 10 includes a low voltage source 20, a storage capacitor C1, an inductor L1, a transistor T1, a diode D1, a capacitor C2, a boost controller circuit 30, a battery 40, a comparator 50, a resistor R1 and a resistor R2. The boost controller circuit 30, the transistor T1, the inductor L1, the diode DL and the capacitor C2 form a boost converter circuit. The low voltage source 20 is a low level power source, conceptually represented as voltage source 22. In an exemplary application, the low voltage source 20 generates 2 uW at 0.5V. The low voltage source 20 also has a source impedance, conceptually represented as resistor RS. As used herein, reference to a "source voltage" refers to voltage VS across the voltage source 22. The transistor T1 functions as a switch that enables current flow from the storage capacitor C1 to the inductor L1 and then to the battery 40, this configuration is typically called a boost converter. When the transistor T1 is turned on, the voltage at VC is applied across the inductor L1 allowing energy to be stored in the inductor L1. While the transistor T1 is on, the diode D1 is reverse biased, thereby blocking the battery 40 voltage and not allowing current to flow out of the battery 40. When the transistor T1 is turned off, the stored energy in the inductor L1 flows through the diode D1 and delivers energy into the battery 40. The capacitor C2 is in parallel with the battery 40 and is used to reduce the impedance of the battery 40 at the switching frequency, and thus filter out pulses of energy coming from the diode D1.

The boost controller circuit 30 supplies a control signal as a gate voltage to the transistor T1, thereby turning the transistor T1 on and off. The boost controller circuit 30 provides a Pulse Width Modulated (PWM) signal to the gate of the transistor T1, thus modulating the amount of energy that is delivered to the battery 40. In the exemplary energy harvesting circuit of FIG. 1A using this type of boost controller, the duty cycle is fixed and the output of the boost controller is regulated by means of a Pulsed Frequency Modulation (PFM) input. The PFM signal regulates the output within a voltage window that is set by an amount of hysteresis in comparator 50 and the reference (REF) input. In other examples, the duty cycle of the PWM output is controlled by a circuit inside of the boost controller circuit 30 that changes the duty cycle as a function of the output voltage when compared to an internal reference. In the example of FIG. 1A, the boost controller circuit 30 is turned on and off by the PFM Enable signal supplied by the comparator 50. A first input of the comparator 50 is coupled to an output of the battery 40. A second input of the comparator 50 is coupled to a reference voltage. The output of the comparator 50 goes low when the battery voltage is above the reference voltage and this is set to be at the fully charged battery voltage. The output of the comparator 50 does not go high until the battery voltage is reduced to a minimum voltage level that is less than the reference voltage due to hysteresis built into the comparator 50. For battery charging, if the battery 40 is at the regulation voltage, then there would be no need for harvesting since the battery would already be charged.

The energy harvesting circuit 10 uses pulse frequency modulation (PFM) to harvest the low power level generated by the low voltage source 20. This is accomplished by monitoring the boosted output voltage across the battery 40 with the comparator 50. However, this type of converter achieves low power operation only when the output is at its desired regulation level and this is when the battery is fully charged. In order to charge the battery 40, the boost converter of FIG. 1A consumes too much power and can not achieve harvesting at 2 uW level. Whenever the battery 40 is lower that the preset voltage level (fully charged) determined by the resistors R1, R2 and the reference voltage (REF), the output of the comparator 50 remains high allowing the boost controller 30 to run continuously. For a battery that is below the regulation level and needs to be charged, the boost controller 30 of FIG. 1A attempts to deliver more energy than there is available at the low voltage source 20, thereby dragging down the voltage at VC. Since the boost controller 30 requires supply current that comes from the battery 40 to perform its function, and if the voltage at VC is too low to allow sufficient energy to be replaced, the boost converter would remove more energy from the battery than it would deliver into the battery.

A disadvantage of the energy harvesting circuit 10 is that in order to harvest energy of a few microwatts at low voltage, it is necessary to consume less energy out of the battery to operate the boost controller 30 compared to the amount of energy being delivered back into the battery. Even assuming that the supply current problem can be overcome, there are other problems with the energy harvesting circuit of FIG. 1A. In order to harvest low power at the 2 uW level, the boost controller 30 needs to have the average inductor L1 current be equal to the average current available from the low voltage source 20. One way to achieve this low current is to make the inductor L1 very large, which is undesirable for most applications. Another way to make the average inductor current very low is to make the converter operate at a very low duty cycle, but this limits the boost converter to one power level and increases the supply current. In an exemplary application, the low voltage source 20 generates 2 uW at 0.5V, and the battery 40 has a charged voltage of 4V. To harvest 2 uW at 0.5V the supply current from the 4V battery to the boost controller 30 needs to be about 100 nA, the drain to source capacitance of the transistor T1 needs to be about 0.1 pF, and the impedance of the inductor L1 needs to be about 40 mH. Typical supply currents for boost converters are in the 10 uA to 100 uA range so it is unrealistic to harvest energy below 40 uW.

The comparator 50 monitors the output of the battery 40, and if the battery voltage is greater than a reference voltage, the PFM Enable signal is low and the boost converter circuit is off. Even with the boost converter circuit off, the comparator 50 still requires power to operate and perform the comparison function. Although the energy harvesting circuit 10 provides a pulse modulation means for periodically turning on and off the boost converter circuit, this architecture is ineffective for charging the battery 40. Using the energy harvesting circuit 10, if the battery 40 needs to be charged, for example the monitored battery output is less than the reference voltage, then the boost controller circuit 30 will always be turned on and the boost converter circuit will always be consuming more power than it can deliver to the battery 40. The low voltage source 20 does not generate enough power to continuously power the boost converter circuit. The boost converter circuit would only turn on and drag down the voltage VC while harvesting, and then consume more power from the battery 40 than is able to be delivered from the low voltage source 20.

The PFM type method utilized in FIG. 1A is useful for turning the boost converter circuit on and off, but the energy harvesting circuit is not applicable to charging a battery. Instead, the PFM type method used in the energy harvesting circuit 10 is more useful for consuming energy from a battery and supplying energy pulses to a load. For example, the energy harvesting circuit of FIG. 1A is adapted to replace the low voltage source 20 with a battery, and replace the battery 40 with a load that requires power delivery of only a couple microwatts. In this configuration, the boost converter circuit can deliver only a couple microwatts, and shut down when not needed. Although useful for providing energy bursts to a load, the energy harvesting circuit described in FIG. 1A does not provide an effective means for charging a battery.

FIG. 1B illustrates a conceptual schematic diagram of a conventional energy harvesting circuit configured to harvest energy from a power source to charge a battery. The energy harvesting circuit 80 includes a power source 24, a storage capacitor C5, an inductor L3, a diode D3, a capacitor C7, a converter controller circuit 60, a battery 42, a capacitor C6, resistors R3-R10, and an enabling circuit 70. The converter controller circuit 60, the inductor L3, the diode D3, the capacitor C6, and the capacitor C7 form a converter circuit. Energy from the solar cell power source 24 is stored in the capacitor C5. The converter controller circuit 60 includes similar functionality as the boost controller circuit 30 and the transistor T1 of FIG. 1A to enable or disable current flow from the capacitor C5 to the inductor L3, and from the inductor L3 to the battery 42. The converter controller circuit 60 is enabled and disabled by the enabling circuit 70, which includes a comparator 72, a comparator 74, and a diode D4. A reference voltage is input to each of the comparators 72 and 74. The voltage of the capacitor C5 is monitored by the comparator 72 and compared to a reference voltage. Once the capacitor voltage reaches the reference voltage, the comparator 72 outputs an enabling signal to the converter controller circuit 60. This initiates discharging of the capacitor C5 for charging of the battery 42. Once the capacitor C5 is discharged to a predetermined minimum voltage level, the comparator 72 outputs a disable signal to the converter controller circuit 60, which in turn is turned off thereby stopping discharge of the capacitor C5.

The comparator 74 monitors the battery voltage and disables the converter controller circuit 60 when the battery voltage reaches a high limit and enables the converter controller circuit 60 when the battery voltage declines below a predetermined level. The dual comparator with hysteresis controls shutdown of the converter controller circuit 60 and also the selection of two different charging rates, such as a fast charge and a trickle charge. During fast charge, the converter controller circuit 60 operates as a current source, forwarding inductor energy from the inductor L3 to the battery 42 without checking the battery voltage. When charging a discharged battery 42, the energy harvesting circuit 80 applies full fast-charge current until the battery voltage reaches its upper limit. The converter controller circuit 60 is then disabled until the battery voltage declines to the next-lowest limit, whereupon the converter controller circuit 60 is enabled for the trickle charge. Trickle charging continues until the battery voltage reaches its upper limit, whereupon the converter controller circuit 60 is disabled, or its lower limit, whereupon the converter controller circuit 60 is enabled for fast-charge again.

As shown in FIG. 1B, the enabling circuit 70 is provided supply voltage V+ from the battery 42. Further, the resistor divider R9, R10 is coupled to the battery 42. As such, the enabling circuit 70 and the resistor divider R9, R10 act as loads on the battery when the converter controller circuit 60 is turned off, or when the energy harvesting circuit 80 is not connected to the solar cell power source 24. Although the energy harvesting circuit 80 may be configured for minimal battery discharge during these conditions, the energy harvesting circuit 80 is ineffective for those applications requiring the energy harvesting circuit 80 to apply zero load to the battery when disabled.

SUMMARY OF THE INVENTION

Embodiments of an energy harvesting circuit are directed to harvesting energy from a voltage source and charging a storage element with the harvested energy. In some embodiments, the energy harvesting circuit is directed to harvesting energy from a very low voltage source at very low power levels. The energy harvesting circuit includes an energy source, a storage capacitor to store energy output from the energy source, a power converter circuit, an energy storage element, and an enabling circuit. In some embodiments, the power converter circuit is a step-up converter, for example a boost converter. In other embodiments, the power converter circuit is a step-down converter. The enabling circuit turns the power converter circuit on and off according to a monitored capacitance voltage of the storage capacitor. When the power converter circuit is turned off, the storage capacitor accumulates energy output from the energy source until a reference voltage is reached. While turned off, no load from the energy harvesting circuit draws current from the energy storage element. Once the storage capacitor voltage reaches the reference voltage, the power converter circuit is turned on, enabling current flow from the storage capacitor to the energy storage element. In some embodiments, the energy storage element voltage is greater than the energy source voltage and the storage capacitor voltage. The power converter circuit enables charging of the energy storage element by an energy pulse received from the storage capacitor. When the storage capacitor discharges to a minimum voltage level, the power converter circuit is turned off. The storage capacitor is recharged by energy output from the energy source. The enabling circuit and a reference voltage supply are both powered by the energy source.

In an aspect, a circuit includes an energy storage element; an energy source; a storage capacitor coupled to the energy source and configured to store energy output from the energy source; a power converter circuit coupled between the storage capacitor and the energy storage element, wherein the power converter circuit converts a storage capacitor voltage stored by the storage capacitor to a voltage to charge the energy storage element; and an enabling circuit coupled between the energy source and the power converter circuit, wherein the enabling circuit pulse modulates the power converter circuit to enable burst energy transfer from the storage capacitor to the energy storage element whenever the storage capacitor voltage reaches a reference voltage, further wherein the enabling circuit is powered by the energy source.

The enabling circuit can be configured to compare the storage capacitor voltage to the reference voltage and output an enabling signal to the power converter circuit if the capacitor voltage is greater than or equal to the reference voltage and output a disabling signal to the power converter circuit if the capacitor voltage is less than the reference voltage. The power converter circuit can be configured to enable burst energy transfer from the storage capacitor to the energy storage element when turned on by the enabling signal and to disable energy transfer when turned off by the disabling signal. When the power converter circuit is disabled there is no power drain on the energy source due to a load. When the power converter circuit is disabled the only power drain on the energy source is due to parasitic drain. The energy storage element has a storage element voltage and the energy source generates power at a source voltage, in some embodiments the source voltage is less than the storage element voltage. In an exemplary application, the energy source generates power in the range of about 2 uW to about 200 uW, and the energy source generates between about 0.4V and about 0.8V. The power converter circuit can be a step-up converter or a step-down converter. The energy storage element can be a battery or a super capacitor. The power converter circuit is powered by the energy storage element when the power converter circuit is turned on. The power converter circuit can include a converter controller circuit and a transistor coupled to the converter controller circuit, the transistor configured to enable and disable current flow between the storage capacitor and the energy storage element, and the converter controller circuit is configured to turn on and off the transistor. The circuit can also include a reference voltage supply coupled to the enabling circuit and configured to supply the reference voltage to the enabling circuit, wherein the reference voltage supply is powered by the energy source. The energy source can be a DC power source or an AC power source. If the energy source is an AC power source the circuit also includes a rectifying circuit coupled between the AC power source and the storage capacitor. The enabling circuit can have positive feedback.

In another aspect, a circuit includes an energy storage element; an energy source; a storage capacitor coupled to the energy source and configured to store energy output from the energy source; a power converter circuit coupled between the storage capacitor and the energy storage element, wherein the power converter enables energy transfer from the storage capacitor to the energy storage element when turned on by an enabling signal and disables energy transfer when turned off by a disabling signal; and an enabling circuit coupled between the energy source and the power converter circuit, wherein the enabling circuit is powered by the energy source, further wherein the enabling circuit compares a storage capacitor voltage to a reference voltage and outputs the enabling signal to the power converter circuit if the capacitor voltage is greater than or equal to the reference voltage and outputs the disabling signal to the power converter circuit if the capacitor voltage is less than the reference voltage.

In yet another aspect, a circuit includes an energy storage element; an energy source; a storage capacitor coupled to the energy source and configured to store energy output from the energy source; a power converter circuit coupled between the storage capacitor and the energy storage element, wherein the power converter enables energy transfer from the storage capacitor to the energy storage element when turned on by an enabling signal and disables energy transfer when turned off by a disabling signal; an enabling circuit coupled between the energy source and the power converter circuit, wherein the enabling circuit is powered by the energy source, further wherein the enabling circuit compares a storage capacitor voltage to a reference voltage and outputs the enabling signal to the power converter circuit if the capacitor voltage is greater than or equal to the reference voltage; and a disabling circuit coupled between the energy source and the power converter circuit, wherein the disabling circuit is powered by the energy storage element only when the power converter circuit is enabled, further wherein the disabling circuit compares the storage capacitor voltage to the reference voltage and outputs the disabling signal to the power converter circuit if the capacitor voltage is less than the reference voltage.

BRIEF DESCRIPTION OF THE DRAWINGS

Embodiments of the energy harvesting circuit are described relative to the several views of the drawings. Where appropriate, the same reference numeral will be used to represent the same or similar elements.

DETAILED DESCRIPTION OF THE EMBODIMENTS

Figure 1A:
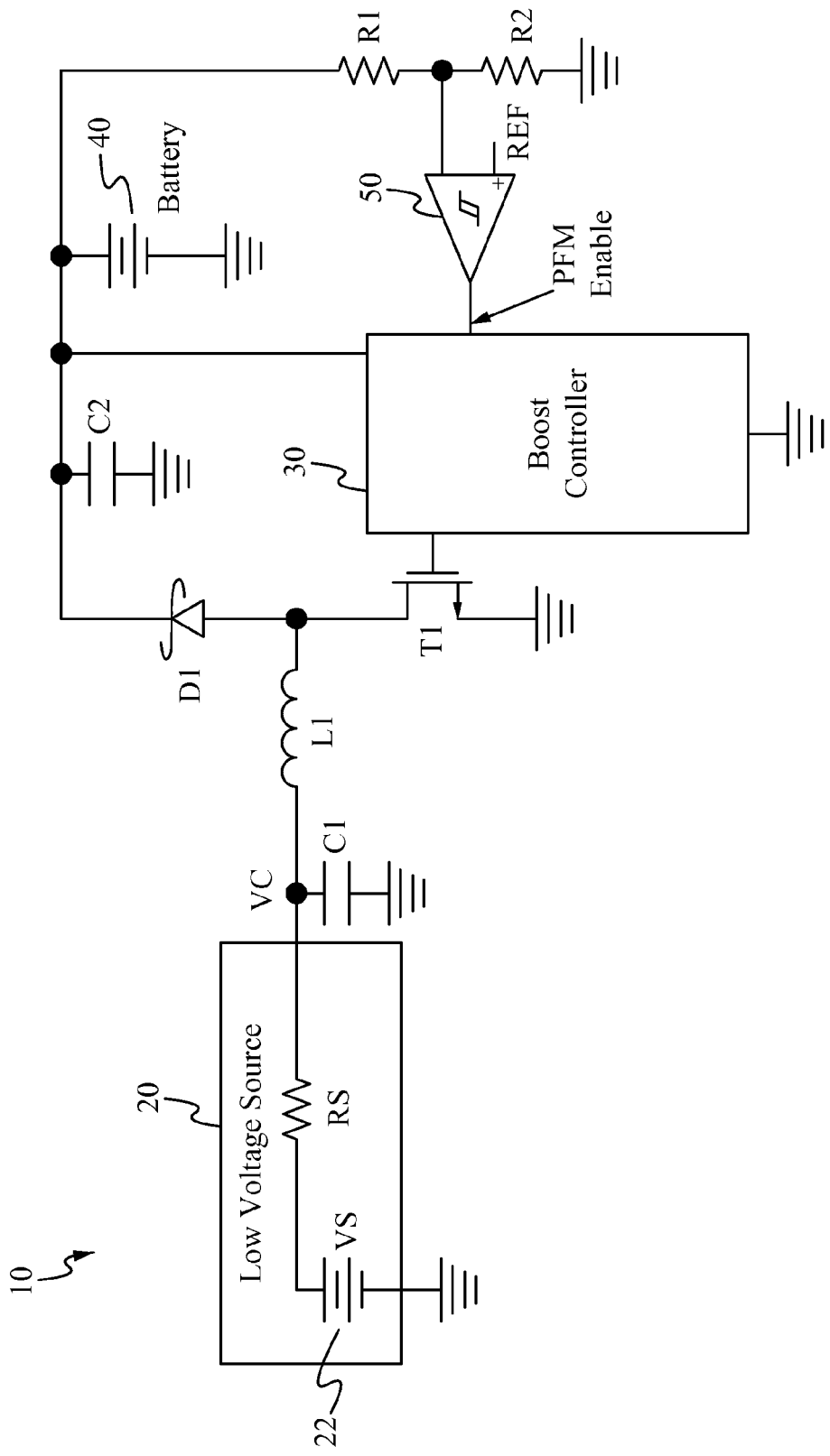
FIG. 1A illustrates a conceptual schematic diagram of a conventional energy harvesting circuit configured to harvest energy from a low power source at low voltage to charge a battery.
Figure 1B:
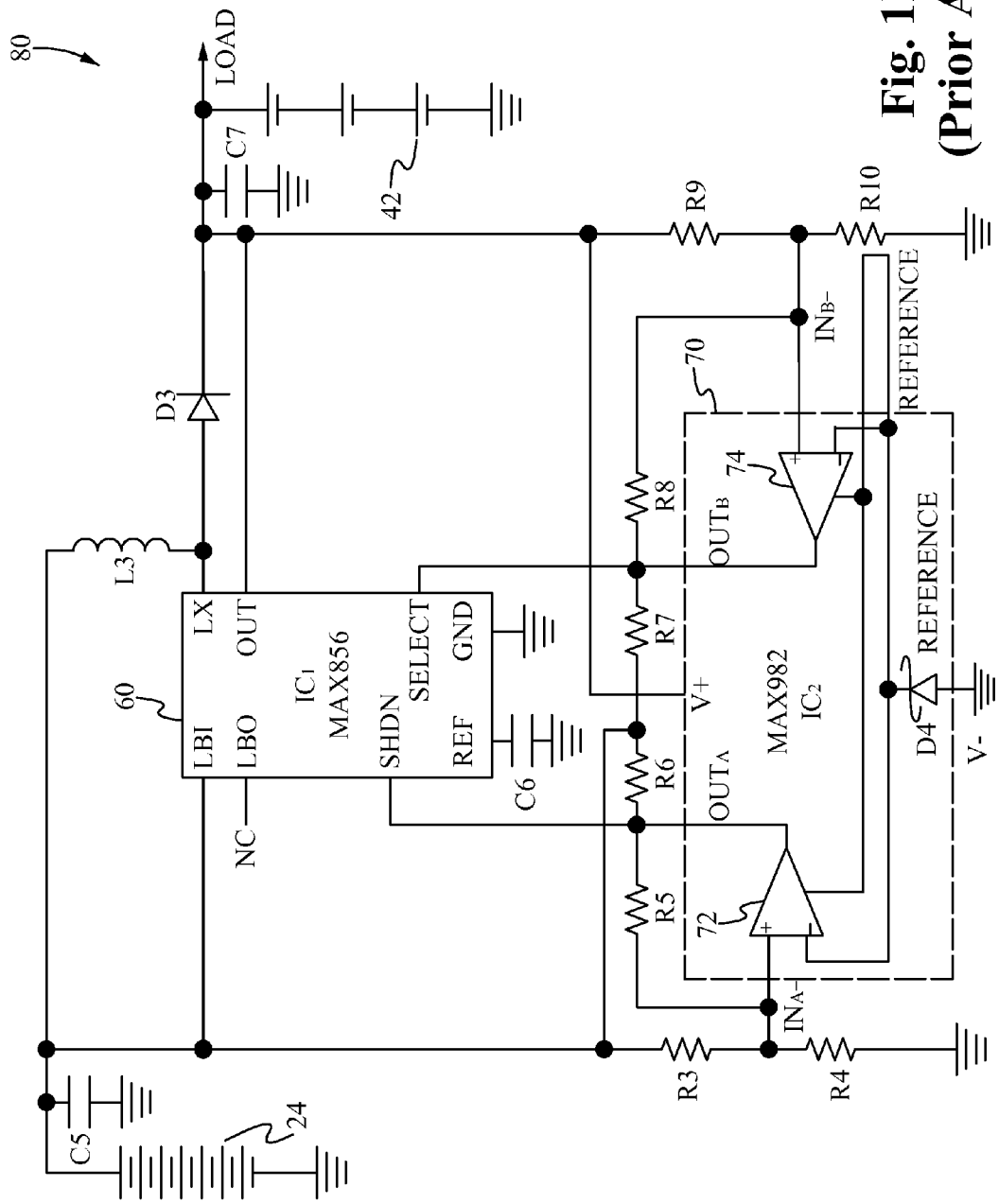
FIG. 1B illustrates a conceptual schematic diagram of another conventional energy harvesting circuit configured to harvest energy from a low power source at low voltage to charge a battery.

Embodiments of the present application are directed to an energy harvesting circuit. Those of ordinary skill in the art will realize that the following detailed description of the energy harvesting circuit is illustrative only and is not intended to be in any way limiting. Other embodiments of the energy harvesting circuit will readily suggest themselves to such skilled persons having the benefit of this disclosure.

Reference will now be made in detail to implementations of the energy harvesting circuit as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of an energy harvesting circuit are directed to harvesting energy from a voltage source and charging a storage element with the harvested energy. The energy harvesting circuit includes an energy source, a storage capacitor to store energy output from the energy source, a power converter circuit, an energy storage element, and an enabling circuit. In some embodiments, the power converter circuit is a step-up converter, for example a boost converter. In other embodiments, the power converter circuit is a step-down converter. Embodiments of the energy harvesting circuit are described below in terms of the energy harvesting circuit including a boost converter circuit. It is understood that the principles described can be applied to alternative types of step-up converters, such as a buck-boost converter, or to step-down converters. In some embodiments, the energy harvesting circuit is directed to harvesting energy from a very low voltage source at very low power levels. In an exemplary application, the low voltage source outputs power in the range of about 2 uW to about 200 uW and at voltage in the range of about 0.4V to about 0.8V.

The energy harvesting circuit pulse modulates a harvesting period to enable concentration of energy into manageable power bursts for charging the storage element. Energy generated by the energy source is stored by the storage capacitor using low current. Once the capacitor voltage reaches a predetermined reference voltage, the boost converter circuit is turned on, thereby discharging the storage capacitor and charging the storage element. The boost converter circuit boosts the capacitor voltage to a level that is greater than the storage element voltage. Once the storage capacitor is discharged to a predetermined minimum voltage level, the boost converter circuit is turned off. The enabling circuit is coupled to the low voltage source and is powered by a low current supplied by the low voltage source. The enabling circuit is also coupled to the storage capacitor to compare the storage capacitor voltage to the reference voltage. The reference voltage is provided by a reference voltage supply. Both the enabling circuit and the reference voltage supply are powered by the energy source. If the storage capacitor voltage is greater than or equal to the reference voltage, an enable signal is sent from the enabling circuit to the boost converter circuit. The enable signal turns on the boost converter circuit. If the storage capacitor circuit is less than the reference voltage, a disable signal is sent from the enabling circuit to the boost converter circuit. The disable signal turns off the boost converter circuit. While the boost converter circuit is turned off, there is no power drain on the storage element other than parasitic drain. In other words, no load from the energy harvesting circuit draws current from the storage element while the boost converter circuit is turned off. The boost converter circuit does not draw power from the storage element when disabled. When enabled, the boost converter circuit is powered by the storage element.

An advantage of the energy harvesting circuit configuration is that energy can be harvested from the low voltage source at any power level down to the supply current of the enabling circuit. In an exemplary application, the use of an enabling circuit with a supply current of 50 nA and a supply voltage of 500 mV results in the ability to harvest energy down to 25 nW. When enabled, the boost converter circuit is powered by the storage element. The supply current of the boost converter circuit need only be less than the output current of the boost converter circuit to enable efficient pulses of energy to be delivered from the storage capacitor to the storage element when the boost converter circuit is turned on.

Figure 2:
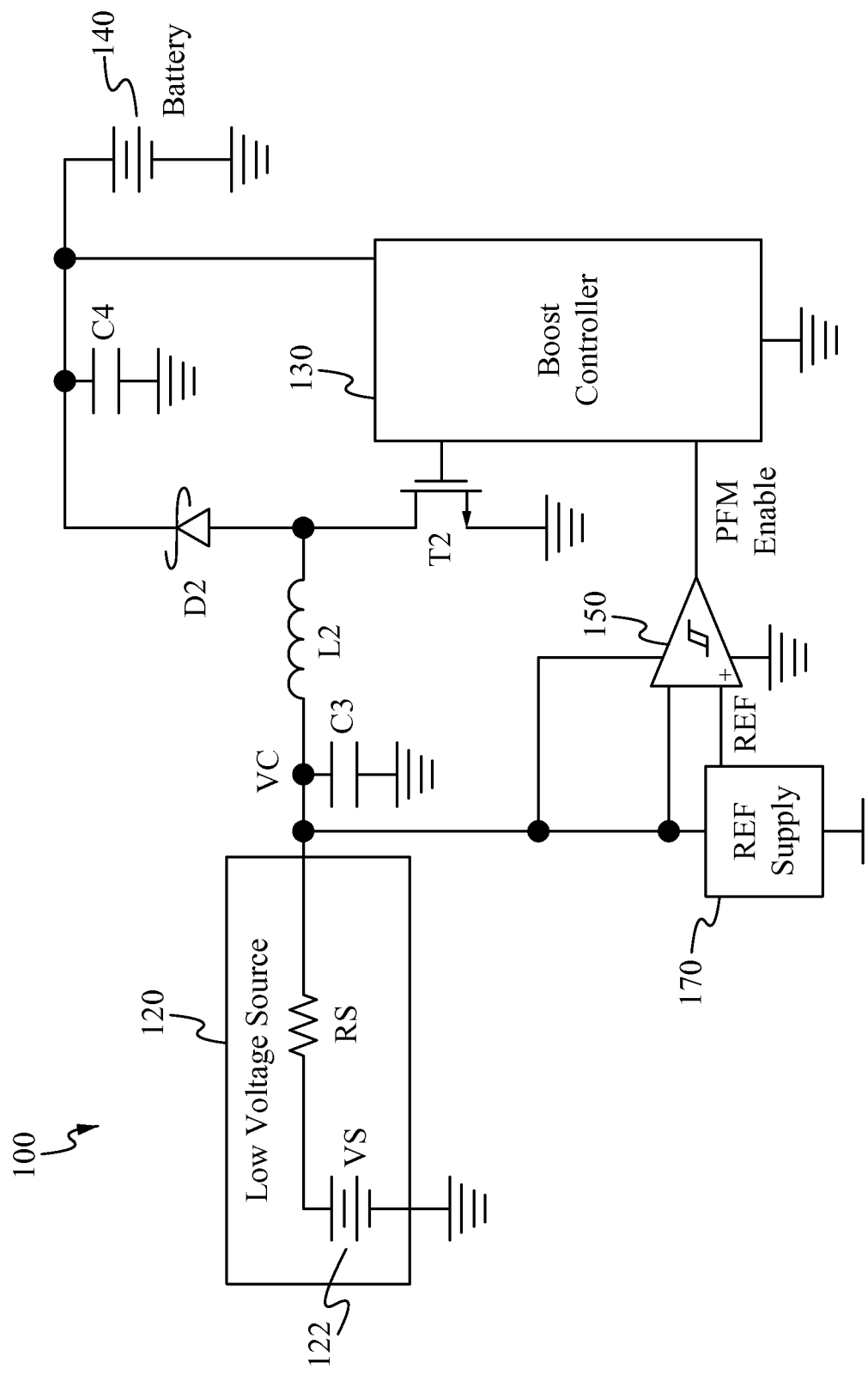
FIG. 2 illustrates a conceptual schematic diagram of an energy harvesting according to an embodiment.

FIG. 2 illustrates a conceptual schematic diagram of an energy harvesting according to an embodiment. The energy harvesting circuit harvests energy from a low voltage source to charge a storage element, such as a battery. In some embodiments, the low voltage source is a solar cell. In other embodiments, the low voltage source is any other conventional low voltage source including, but not limited to, a thermal electric generator (TEG). The energy harvesting circuit is configured to pulse modulate the transfer of the harvested energy to the battery. The energy harvesting circuit 100 includes a low voltage source 120, a storage capacitor C3, an inductor L2, a transistor T2, a diode D2, a capacitor C4, a boost controller circuit 130, a battery 140, an enabling circuit 150, and a reference voltage supply 170. The low voltage source 120 is a low level power source, conceptually represented as voltage source 122 having a voltage VS. The low voltage source 120 also has a source impedance, conceptually represented as resistor RS. As used herein, reference to a "source voltage" refers to the voltage VS across the voltage source 122. In an exemplary application, the source voltage is about 0.5V, and the low voltage source 120 generates 2 uW at 0.5V. A voltage source is typically referred to as low voltage when a harvesting circuit, such as the boost converter circuit of FIG. 2, is not able to operate directly from the low voltage source and needs to consume power from a battery or other source that is within the needed voltage level. A low level power source is a source that delivers less power than it takes to run a voltage converter, such as the boost converter circuit of FIG. 2, without any power delivered to the load.

The boost controller circuit 130, the transistor T2, the inductor L2, the diode D2, and the capacitor C4 form a boost converter circuit for boosting the voltage stored in the capacitor C3 to a voltage level that is greater than the battery voltage. The transistor T2 functions as a switch that enables current flow from the storage capacitor C3 to the inductor L2 and then to the battery 140, this configuration is typically called a boost converter. When the transistor T2 is turned on, the voltage at VC is applied across the inductor L2 allowing energy to be stored in the inductor L2. While the transistor T2 is on, the diode D2 is reverse biased, thereby blocking the battery 140 voltage and not allowing current to flow out of the battery 140. When the transistor T2 is turned off, the stored energy in the inductor L2 flows through the diode D2 and delivers energy into the battery 140. The capacitor C4 is in parallel with the battery 140 and is used to reduce the impedance of the battery 140 at the switching frequency, and thus filter out pulses of energy coming from the diode D2. The transistor T2 is turned on and off by the boost controller 130.

The boost controller 130 is turned on and off with the PFM Enable signal. The PFM Enable signal is output by the enabling circuit 150. In some embodiments, the enabling circuit 150 is a hysteretic comparator. A positive input of the comparator 150 is coupled to the capacitor C3. A negative input of the comparator 150 is coupled to the reference voltage supply 170 to receive as input a reference voltage. The comparator 150 compares the voltage of the capacitor C3 to the reference voltage. The PFM Enable signal output of the comparator 150 goes high (enables) when the voltage on the capacitor C3 is greater than or equal to the reference voltage. The PFM Enable signal goes low (disables) when the voltage on the capacitor C3 is lower than a predetermined minimum voltage level. The PFM Enable signal output from the comparator 150 does not go low until the battery voltage is reduced to the minimum voltage level due to hysteresis built into the comparator 150. In an exemplary application, the reference voltage is about 0.5V, and the minimum voltage level is about 0.3V. The voltage levels that dictate the output of the comparator 150 are only exemplary, alternative voltage levels can be used.

For the boost converter circuit to work properly in a system that has the battery connected to the input supply of the boost converter circuit and at the same time not draw any current when disabled, it requires that the enabling input to the boost converter circuit has a CMOS Schmitt trigger input stage that disables everything in the boost converter circuit. If the input to the enabling pin on the boost converter circuit is anything but high or low then it will discharge the battery. If the enabling circuit (comparator 150) has low gain at its trip point, then there is the possibility to have the output of the enabling circuit be partially on. Any output state that is not fully on or fully off will cause the boost converter circuit input to draw power and thus discharge the battery. When the enabling circuit has very high gain or hysteresis, sometimes referred to as positive feedback, then there is not any voltage level at its input that will allow its output to be at any level except high or low.

The comparator 150 and the reference voltage supply 170 are powered from the low voltage source 120, not from the battery 140. The comparator 150 and the reference voltage supply 170 are not powered by the battery 140 because if it were connected to the battery 140 and the voltage VC remained less than the reference voltage level for a long period of time and therefore no energy harvesting, the comparator 150 and the reference voltage supply 170 would remove some or all stored energy in the battery 140. If the comparator 150 and the reference voltage supply 170 are connected to the low voltage source 120, as is the case in the energy harvesting circuit 100, then with these same conditions of no energy harvesting, this configuration allows the battery 140 to remain at its current storage level and not be discharged by a load. While the boost converter circuit is turned off, there is no power drain on the battery 140 other than parasitic drain. In other words, no load from the energy harvesting circuit 100 draws current from the battery 140 while the boost converter circuit is turned off. The boost converter circuit does not draw power from the battery 140 when disabled. When enabled, the boost converter circuit is powered by the battery 140.

The supply current to the comparator 150 and the reference voltage supply 170 must be low enough to allow the charging of the capacitor C3. To determine the allowable supply current of comparator 150 and the reference voltage supply 170, the power consumed by the comparator 150 and the reference voltage supply 170 must be less than the desired harvest value, where the power consumed by the comparator 150 and the reference voltage supply 170 is the supply current multiplied by the voltage VC. In the example of 2 uW of energy harvesting at 0.5V, the comparator 150 and the reference voltage supply 170 need to have a supply current less than 4 uA if connected to the low voltage source 120.

In an alternate configuration, the comparator 150 and the reference voltage supply 170 can be powered by a secondary low voltage source that can deliver lower power than the primary power source, but the primary power source is at a much lower voltage than the secondary power source. An example of the alternate configuration with two input power sources is where the primary power source voltage is in the range of about 0.025V to about 0.05V, while the secondary power source voltage is in the range of about 0.4V to about 0.8V.

Figure 3:
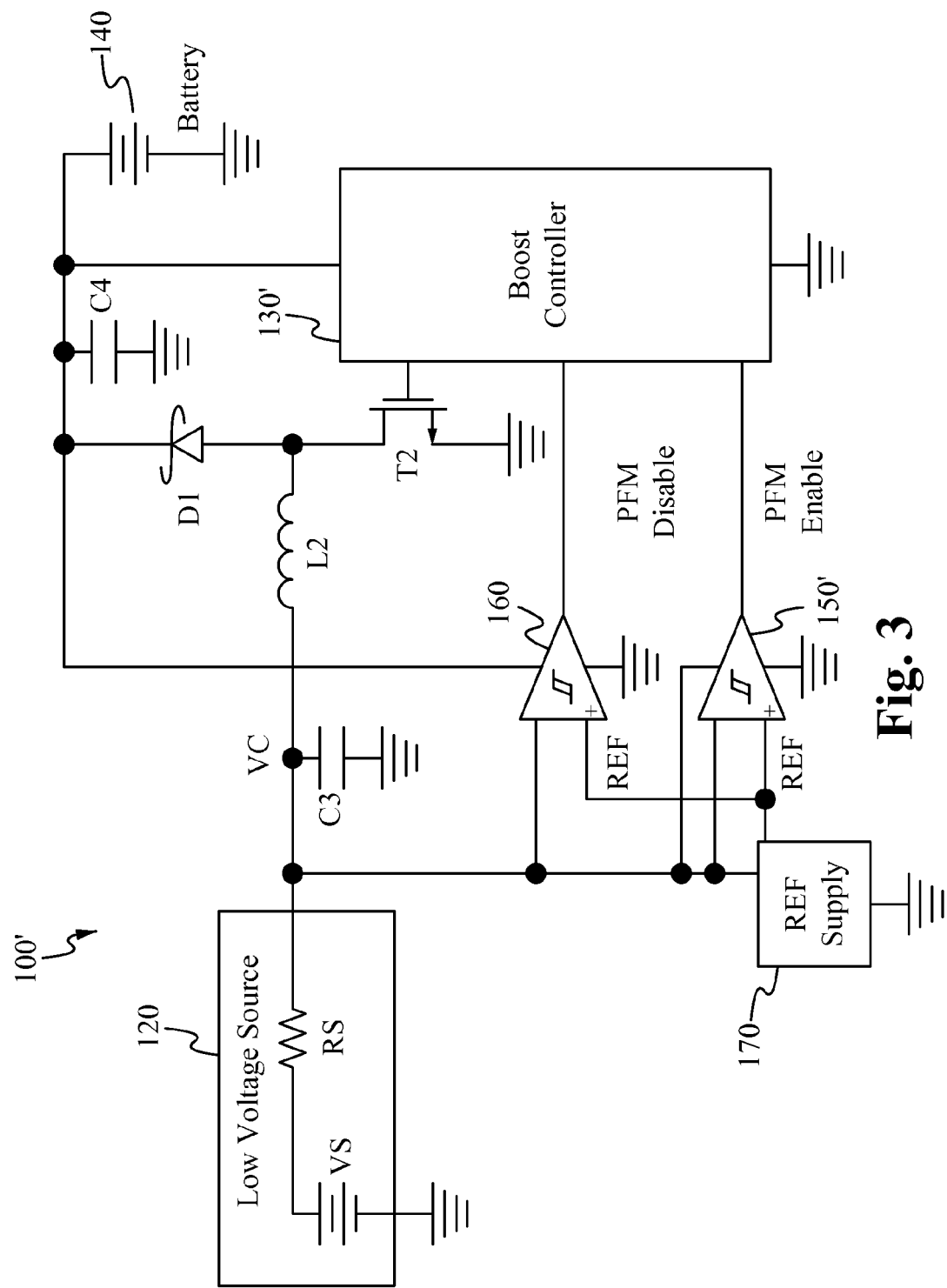
FIG. 3 illustrates a conceptual schematic diagram of an energy harvesting according to another embodiment.

In another alternative configuration, shown in FIG. 3, a comparator 150' is the same as the comparator 150 (FIG. 2) except that the output of the comparator 150' is only used to enable a boost controller circuit 130' and not to disable the boost controller circuit 130'. In this alternative configuration, a separate comparator 160 is used to disable the boost controller circuit 130'. The disabling comparator 160 is supplied from the battery 140 because the disabling comparator 160 can be turned off when the boost controller circuit 130' is off and thus not drain the battery 140 when the harvesting source is not present. In some embodiments, the enabling input from comparator 150' and the disabling input from comparator 160 are connected to Set and Reset inputs of a latch inside of the boost controller circuit 130'.

Although the enabling circuit is described as a comparator, other configurations are contemplated. In general, the enabling circuit is powered by the low voltage source, the enabling circuit has trip levels that are manageable within some tolerance range that is acceptable, and the enabling circuit outputs an enabling signal.

Referring to FIG. 2, the boost converter circuit, and in particular the boost controller 130, draws power from the battery 140 when enabled. When turned on, the boost controller 130 uses a certain amount of power to operate. The transistor T2 has a drain to source capacitance, which results in a power loss each time the transistor is switched. Additionally, there are power losses in the inductor L2 and the diode D2. As such, there is a minimum power requirement to operate the boost converter circuit. The energy harvesting circuit 100 is configured to harvest energy in bursts at high power levels for very short periods of time. For example, 2 uW of power can be harvested with a boost converter connected to a 4V battery, the boost converter having a supply current of 10 uA and operated in a pulsed mode of operation. In this example, the boost converter consumes 40 uW of power from the battery while delivering 10 mW of power into the battery, which is highly efficient. In order to balance the available input power of 2 uW to the 10 mW pulse of higher power, this example using the energy harvesting circuit 100 enables the 10 mW to charge the battery for about 20 u seconds and then turn off for about 100 m seconds. The value of 10 mW comes from a charge current of 2.5 mA into a 4V battery. The time ratio of 20 us to 100 ms is the same ratio of 2 uW input power to 10 mW output power thus allowing the average power harvested to be 2 uW. Pulse harvesting in this manner can be performed if the boost converter circuit is powered from the battery 140 at a lower power level than is being transferred from the capacitor C3 to the battery 140. Since the energy is transferred as a burst from the capacitor C3 to the battery 140, the amount of power used during the short bust that is consumed by the boost converter circuit can be much greater than the instantaneous power generated by the low voltage source 122. In an exemplary application, the low voltage source 120 generates about 2 uW of average power. The boost converter circuit supply power can be much greater than 2 uW, for example 40 uW, because the pulse energy transfer from the capacitor C3 to the battery 140 is delivered in milliamps, 2.5 mA in this example. During pulse harvesting period when the boost converter circuit is turned on, the power used to operate the boost converter circuit is less than the amount of power delivered to the battery.

In an exemplary implementation, the low voltage source 120 generates about 2 uW at about 0.5V. The capacitor C3 has a capacitance of about 10 uF, the capacitor C4 has a capacitance of about 0.1 uF, and the inductor has an impedance of about 1 uH. When compared to the circuit 10 of FIG. 1A, the energy harvesting circuit 100 uses an inductor L2 having an impedance in microhenries instead of millihenries as with the inductor L1 (FIG. 1A). The battery 140 has a battery voltage of about 4V, and the boost controller 130 boosts the voltage of the capacitor C3 to about 4.2V. It is understood that the energy harvesting circuit 100 can be configured with components having alternative values. For example, the low voltage source 120 can be configured to generate voltage down to much lower levels then the exemplary 0.5V, such as down to 10 mV. The enabling circuit is simply changed to have a lower input reference voltage.

In operation, the energy generated by the low voltage source 120 charges the capacitor C3 while the boost converter circuit is turned off. The voltage VC of the capacitor C3 is monitored by the comparator 150 and compared to the reference voltage Vref. While capacitor voltage VC is less than the reference voltage Vref, the PFM Enable signal output from the comparator 150 to the boost controller 130 is low and the boost converter circuit is turned off. Once the capacitor voltage VC is greater than or equal to the reference voltage Vref, the PFM Enable signal goes high, thereby turning on the boost converter circuit. When the boost converter circuit is turned on, the energy stored in the capacitor C3 is discharged from the capacitor C3 and boosted by the boost converter circuit to a voltage that exceeds the battery voltage. The boosted voltage charges the battery 140. The capacitor C3 discharges until the capacitor voltage VC drops to a minimum voltage Vmin, at which point the PFM Enable signal goes low, thereby turning off the boost converter circuit. The low voltage source 120 charges the capacitor C3 while the boost converter circuit is turned off.

Figure 4:
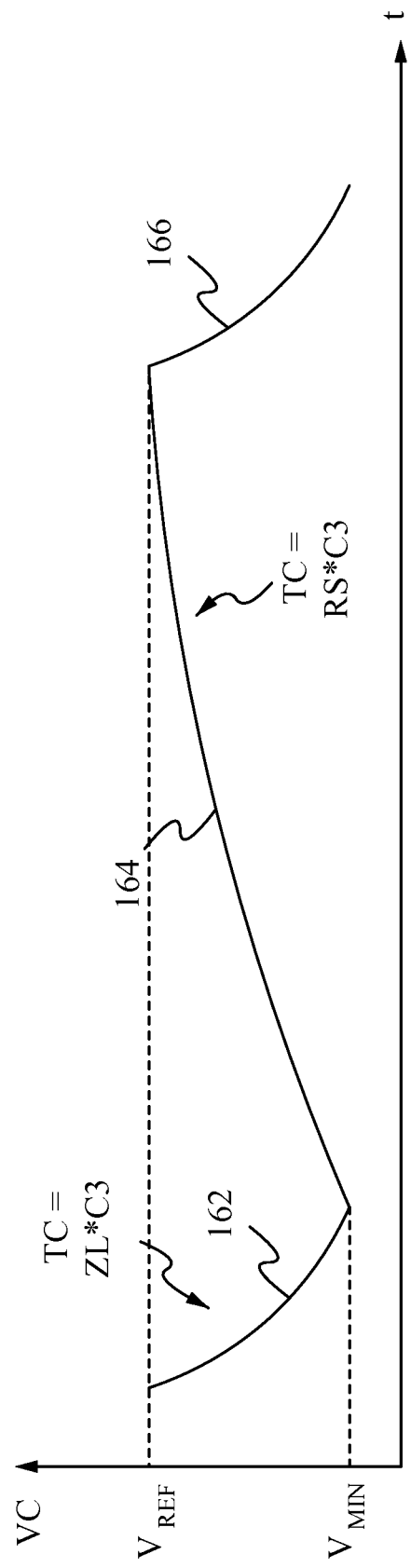
FIG. 4 illustrates an exemplary capacitor voltage function for the storage capacitor C3 in FIG. 2.

FIG. 4 illustrates an exemplary capacitor voltage function for the storage capacitor C3 in FIG. 2. Portions 162 and 166 of the voltage function corresponds to the discharging of the capacitor C3. The capacitor C3 starts discharging once the capacitor voltage VC reaches the reference voltage Vref, and continues to discharge until the capacitor voltage VC drops to the minimum voltage Vmin that is set to be efficient. Portion 164 of the voltage function corresponds to the charging of the capacitor C3. The capacitor C3 starts charging once the capacitor voltage VC reaches the minimum voltage Vmin, and continues to charge until the capacitor voltage increases to the reference voltage Vref. The capacitor C3 charges and discharges according to different time constants, as indicated by the differently shaped curves of the portions 162 (discharging) and 164 (charging). The capacitor C3 discharges according to a discharge time constant (TC) determined by the impedance of the inductor L2 and the capacitor C3 (TC=ZL*C3). The capacitor C3 charges according to a charging TC determined by the internal resistance RS of the low voltage source 120 and the impedance of the capacitor C3 (TC=RS*C3). In implementation, the ratio of the discharge time constant to the charge time constant is configured to be hundreds or thousands to one. The charge time constant is relatively large because the low voltage source 120 has an impedance RS that is much larger than an impedance ZL of the boost converter. The discharge time constant is relatively low because energy is delivered from the capacitor to the battery 140 as a high energy pulse. For illustrative purposes, the voltage function shown in FIG. 4 shows the general charging and discharging nature of the capacitor C3. However, the discharge time constant manifested in curves 162 and 166, and the charge time constant manifested in curve 164 are not representative of an implementation where the ratio is hundreds or thousands to one. The curves shown in FIG. 4 are merely a convenience so that a full cycle of charging and discharging can be shown on the same graph.

Embodiments of the energy harvesting circuits above are described as a voltage source that provides a DC input to the storage capacitor. The energy harvesting circuits can be alternatively configured to include an AC power source, in which case a rectifying circuit is added between the energy source and the storage capacitor Although the energy harvesting circuit is described as harvesting energy to charge a battery, the energy harvesting circuit can be used to charge other types of storage elements, such as super capacitors. In general, any storage element can be used that has the capability of accepting pulse charges and integrating these charges as an accumulated energy reserve. The energy harvesting circuit provides means for charging the storage element using an energy source having a low power level relative to the storage element energy storage capacity.

FIG. 2 shows the comparator 150, the boost controller 130, the transistor T2, the inductor L2, the diode D2, and the capacitor C4 as separate components. In some embodiments, the comparator 150 is integrated with the boost controller 130. In some embodiments, the transistor T2 is integrated with the boost controller 130. In some embodiments, the diode D2 is integrated with the boost controller 130, and the capacitor C4 and the inductor L2 are external. In some cases, the inductor L2 can be integrated into the boost controller, for example where the inductor L2 has an impedance of 1 uH, and/or the capacitor C4 can be integrated into the boost controller, for example where the capacitor C4 has a capacitance of 0.1 uF. In general, some or all of these components can be integrated.

Although the embodiments of the energy harvesting circuit describe an energy harvesting circuit having a boost converter, it is understood that the principles described can be applied to alternative types of step-up converters or to step-down converters.

The energy harvesting circuit has been described in terms of specific embodiments incorporating details to facilitate the understanding of the principles of construction and operation of the energy harvesting circuit. Such references, herein, to specific embodiments and details thereof are not intended to limit the scope of the claims appended hereto. It will be apparent to those skilled in the art that modifications can be made in the embodiments chosen for illustration without departing from the spirit and scope of the energy harvesting circuit.

What is claimed is:
1. A circuit comprising:
 a. an energy storage element;
 b. an energy source;
 c. a storage capacitor coupled to the energy source and configured to store energy output from the energy source;
 d. a power converter circuit coupled between the storage capacitor and the energy storage element, wherein the power converter circuit converts a storage capacitor voltage stored by the storage capacitor to a voltage to charge the energy storage element; and e. an enabling circuit coupled between the energy source and the power converter circuit, wherein the enabling circuit pulse modulates the power converter circuit to enable burst energy transfer from the storage capacitor to the energy storage element whenever the storage capacitor voltage reaches a reference voltage, further wherein the enabling circuit is powered by the energy source.

2. The circuit of claim 1 wherein the enabling circuit is configured to compare the storage capacitor voltage to the reference voltage and output an enabling signal to the power converter circuit if the capacitor voltage is greater than or equal to the reference voltage and output a disabling signal to the power converter circuit if the capacitor voltage is less than the reference voltage.

3. The circuit of claim 2 wherein the power converter circuit is configured to enable burst energy transfer from the storage capacitor to the energy storage element when turned on by the enabling signal and to disable energy transfer when turned off by the disabling signal.

4. The circuit of claim 2 wherein when the power converter circuit is disabled there is no power drain on the energy source due to a load.

5. The circuit of claim 2 wherein when the power converter circuit is disabled the only power drain on the energy source is due to parasitic drain.

6. The circuit of claim 1 wherein the energy storage element has a storage element voltage and the energy source generates power at a source voltage, further wherein the source voltage is less than the storage element voltage.

7. The circuit of claim 1 wherein the energy source generates power in the range of about 2 uW to about 200 uW.

8. The circuit of claim 7 wherein the energy source generates between about 0.4V and about 0.8V.

9. The circuit of claim 1 wherein the power converter circuit comprises a step-up converter.

10. The circuit of claim 1 wherein the power converter circuit comprises a step-down converter.

11. The circuit of claim 1 wherein the energy storage element comprises a battery.

12. The circuit of claim 1 wherein the energy storage element comprises a super capacitor.

13. The circuit of claim 1 wherein the power converter circuit is powered by the energy storage element when the power converter circuit is turned on.

14. The circuit of claim 1 wherein the power converter circuit comprises a converter controller circuit and a transistor coupled to the converter controller circuit, the transistor configured to enable and disable current flow between the storage capacitor and the energy storage element, and the converter controller circuit is configured to turn on and off the transistor.

15. The circuit of claim 1 further comprising a reference voltage supply coupled to the enabling circuit and configured to supply the reference voltage to the enabling circuit, wherein the reference voltage supply is powered by the energy source.

16. The circuit of claim 1 wherein the energy source comprises a DC power source.

17. The circuit of claim 1 wherein the energy source comprises an AC power source.

18. The circuit of claim 17 further comprising a rectifying circuit coupled between the AC power source and the storage capacitor.

19. The circuit of claim 1 wherein the enabling circuit has positive feedback.

20. A circuit comprising:
a. an energy storage element;
b. an energy source;
c. a storage capacitor coupled to the energy source and configured to store energy output from the energy source;
d. a power converter circuit coupled between the storage capacitor and the energy storage element, wherein the power converter enables energy transfer from the storage capacitor to the energy storage element when turned on by an enabling signal and disables energy transfer when turned off by a disabling signal; and
e. an enabling circuit coupled between the energy source and the power converter circuit, wherein the enabling circuit is powered by the energy source, further wherein the enabling circuit compares a storage capacitor voltage to a reference voltage and outputs the enabling signal to the power converter circuit if the capacitor voltage is greater than or equal to the reference voltage and outputs the disabling signal to the power converter circuit if the capacitor voltage is less than the reference voltage.

21. The circuit of claim 20 wherein when the power converter circuit is disabled there is no power drain on the energy source due to a load.

22. The circuit of claim 20 wherein when the power converter circuit is disabled the only power drain on the energy source is due to parasitic drain.

23. The circuit of claim 20 wherein the energy storage element has a storage element voltage and the energy source generates power at a source voltage, further wherein the source voltage is less than the storage element voltage.

24. The circuit of claim 20 wherein the energy source generates power in the range of about 2 uW to about 200 uW.

25. The circuit of claim 24 wherein the energy source generates between about 0.4V and about 0.8V.

26. The circuit of claim 20 wherein the power converter circuit comprises a step-up converter.

27. The circuit of claim 20 wherein the power converter circuit comprises a step-down converter.

28. The circuit of claim 20 wherein the storage element comprises a battery.

29. The circuit of claim 20 wherein the storage element comprises a super capacitor.

30. The circuit of claim 20 wherein the power converter circuit is powered by the energy storage element when the power converter circuit is turned on.

31. The circuit of claim 20 wherein the power converter circuit comprises a converter controller circuit and a transistor coupled to the converter controller circuit, the transistor configured to enable and disable current flow between the storage capacitor and the energy storage element, and the converter controller circuit is configured to turn on and off the transistor.

32. The circuit of claim 20 further comprising a reference voltage supply coupled to the enabling circuit and configured to supply the reference voltage to the enabling circuit, wherein the reference voltage supply is powered by the energy source.

33. The circuit of claim 20 wherein the energy source comprises a DC power source.

34. The circuit of claim 20 wherein the energy source comprises an AC power source.

35. The circuit of claim 34 further comprising a rectifying circuit coupled between the AC power source and the storage capacitor.

36. The circuit of claim 20 wherein the enabling circuit has positive feedback.

37. A circuit comprising:
a. an energy storage element;
b. an energy source;
c. a storage capacitor coupled to the energy source and configured to store energy output from the energy source;
d. a power converter circuit coupled between the storage capacitor and the energy storage element, wherein the power converter enables energy transfer from the storage capacitor to the energy storage element when turned on by an enabling signal and disables energy transfer when turned off by a disabling signal;
e. an enabling circuit coupled between the energy source and the power converter circuit, wherein the enabling circuit is powered by the energy source, further wherein the enabling circuit compares a storage capacitor voltage to a reference voltage and outputs the enabling signal to the power converter circuit if the capacitor voltage is greater than or equal to the reference voltage; and
f. a disabling circuit coupled between the energy source and the power converter circuit, wherein the disabling circuit is powered by the energy storage element only when the power converter circuit is enabled, further wherein the disabling circuit compares the storage capacitor voltage to the reference voltage and outputs the disabling signal to the power converter circuit if the capacitor voltage is less than the reference voltage.

* * * * *